US010048695B2

(12) United States Patent
Hoshino

(10) Patent No.: US 10,048,695 B2
(45) Date of Patent: Aug. 14, 2018

(54) TRAVELING DEVICE

(71) Applicant: TOSHIBA LIFESTYLE PRODUCTS & SERVICES CORPORATION, Ome-shi (JP)

(72) Inventor: Susumu Hoshino, Owariasahi (JP)

(73) Assignee: TOSHIBA LIFESTYLE PRODUCTS & SERVICES CORPORATION, Ome-shi (JP)

( * ) Notice: Subject to any disclaimer, the term of this patent is extended or adjusted under 35 U.S.C. 154(b) by 0 days.

(21) Appl. No.: 15/110,340

(22) PCT Filed: Jan. 9, 2015

(86) PCT No.: PCT/JP2015/050487
§ 371 (c)(1),
(2) Date: Jul. 7, 2016

(87) PCT Pub. No.: WO2015/105176
PCT Pub. Date: Jul. 16, 2015

(65) Prior Publication Data
US 2016/0327954 A1 Nov. 10, 2016

(30) Foreign Application Priority Data
Jan. 9, 2014 (JP) .................................. 2014-002708

(51) Int. Cl.
*G05D 1/02* (2006.01)
*B60L 11/18* (2006.01)
(Continued)

(52) U.S. Cl.
CPC .......... *G05D 1/0225* (2013.01); *A47L 9/2815* (2013.01); *A47L 9/2852* (2013.01);
(Continued)

(58) Field of Classification Search
CPC ..... A01D 34/008; G01S 1/805; G05D 1/0225
See application file for complete search history.

(56) References Cited

U.S. PATENT DOCUMENTS 8,027,761 B1 * 9/2011 Nelson ................ A01D 34/008
180/168
2006/0273749 A1 12/2006 Im
2008/0065266 A1 3/2008 Kim

FOREIGN PATENT DOCUMENTS

JP 59-195711 A 11/1984
JP 61-97715 A 5/1986
(Continued)

OTHER PUBLICATIONS

International Search Report dated Apr. 7, 2015 in PCT/JP2015/050487 Filed Jan. 9, 2015.

*Primary Examiner* — Bryan A Evans
(74) *Attorney, Agent, or Firm* — Oblon, McClelland, Maier & Neustadt, L.L.P.

(57) ABSTRACT

A vacuum cleaner includes a charging unit including first and second light emitting parts arranged in positions separated from each other. The light emitting parts transmit respective guide signals to guide a vacuum cleaner body. The charging unit includes a charging unit controller to make the light emitting parts transmit the respective guide signals that are same guide signals and transmitted according to respective timings. The vacuum cleaner body includes a third light emitting part to transmit a demand signal. The vacuum cleaner body includes a light receiving part capable of receiving the respective guide signals transmitted from the first and second light emitting parts. A controller makes the body case travel toward the charging unit depending on respective receiving statuses at the light receiving part of the two guide signals transmitted from the first and second light emitting parts and according to the respective timings.

2 Claims, 5 Drawing Sheets

(51) Int. Cl.
  *A47L 9/28* (2006.01)
  *A47L 11/40* (2006.01)
  *G05D 1/00* (2006.01)

(52) U.S. Cl.
  CPC ....... *A47L 11/4011* (2013.01); *A47L 11/4013* (2013.01); *A47L 11/4041* (2013.01); *A47L 11/4069* (2013.01); *G05D 1/0088* (2013.01); *G05D 1/0242* (2013.01); *A47L 2201/022* (2013.01); *A47L 2201/04* (2013.01); *G05D 2201/0203* (2013.01)

(56) References Cited

FOREIGN PATENT DOCUMENTS

| | | |
|---|---|---|
| JP | 2003-1577 A | 1/2003 |
| JP | 2006-344202 A | 12/2006 |
| JP | 2009-15611 A | 1/2009 |
| JP | 4480730 B2 | 6/2010 |
| KR | 10-06458141 B1 | 11/2006 |

\* cited by examiner

TRAVELING DEVICE

CROSS-REFERENCE TO RELATED APPLICATIONS

The present application is a National Stage Application of PCT/JP2015/050487 filed on Jan. 9, 2015. The PCT application acclaims priority to Japanese Patent Application No. 2014-002708 filed on Jan. 9, 2014. All of the above applications are herein incorporated by reference.

TECHNICAL FIELD

An embodiment of this invention relates to a traveling device including an autonomous traveling unit capable of traveling autonomously and a beacon unit to guide the autonomous traveling unit.

BACKGROUND ART

A conventional vacuum cleaner (cleaning robot), which is an autonomous traveling type, for example, cleans a floor surface as a surface to be cleaned, while traveling on the floor surface autonomously and detecting an obstacle etc. by using a sensor, vacuum cleaner is generally controlled in such a way that after it finishes cleaning, the vacuum cleaner returns to a charging unit (goes home) autonomously for charge of a built-in secondary cell. The charging unit outputs a guide signal such as an infrared ray to guide the vacuum cleaner to the charging unit.

For example, to guide the vacuum cleaner, the charging unit outputs a left-side guide signal and a right-side guide signal. The vacuum cleaner is controlled to move to the right side relatively in response to receipt of the left-side guide signal and to the left side relatively in response to receipt of the right-side guide signal. As a result, the vacuum cleaner can be guided towards the charging unit along an area where both of these guide signals can be received.

If the charging unit is to output these left-side and right-side guide signals simultaneously, these signals should be of different types so as to be distinguished from each other. This complicates a structure or processing required for generating signals. Additionally, the charging unit is to output guide signals all the time. As a result of this, a large amount of power will be consumed and interference with a signal output, for example, from a different unit may be caused easily.

CITATION LIST

Patent Literature

PTL 1: Japanese Patent No. 4480730

SUMMARY OF INVENTION

Technical Problem

A problem to be solved by this invention is to provide a traveling device capable of having a simple structure, reducing power consumption, and making interference with a different unit unlikely.

Solution to Problem

A traveling device according to an embodiment includes an autonomous traveling unit capable of traveling autonomously and a beacon unit to guide the autonomous traveling unit. The beacon unit includes a beacon unit-side receiving part capable of receiving a demand signal from the autonomous traveling unit. The beacon unit further includes one beacon unit-side transmitting part and a different beacon unit-side transmitting part arranged in positions separated from each other. The beacon unit-side transmitting parts transmit respective guide signals to guide the autonomous traveling unit. The beacon unit further includes transmission controller to make the one beacon unit-side transmitting part and the different beacon unit-side transmitting part transmit the respective guide signals that are same guide signals which are transmitted according to respective timings. The autonomous traveling unit includes a body case. The autonomous traveling unit further includes a drive wheel to allow travel of the body case. The autonomous traveling unit further includes a controller to make the body case travel autonomously by controlling drive of the drive wheel. The autonomous traveling unit further includes a transmitting part to transmit the demand signal. The autonomous traveling unit further includes a receiving part capable of receiving the respective guide signals transmitted from the one beacon unit-side transmitting part and the different beacon unit-side transmitting part. The controller makes the body case travel toward the beacon unit depending on respective receiving statuses at the receiving part of the two guide signals transmitted from the one beacon unit-side transmitting part and the different beacon unit-side transmitting part according to the respective timings.

DESCRIPTION OF EMBODIMENTS

Figure 1:
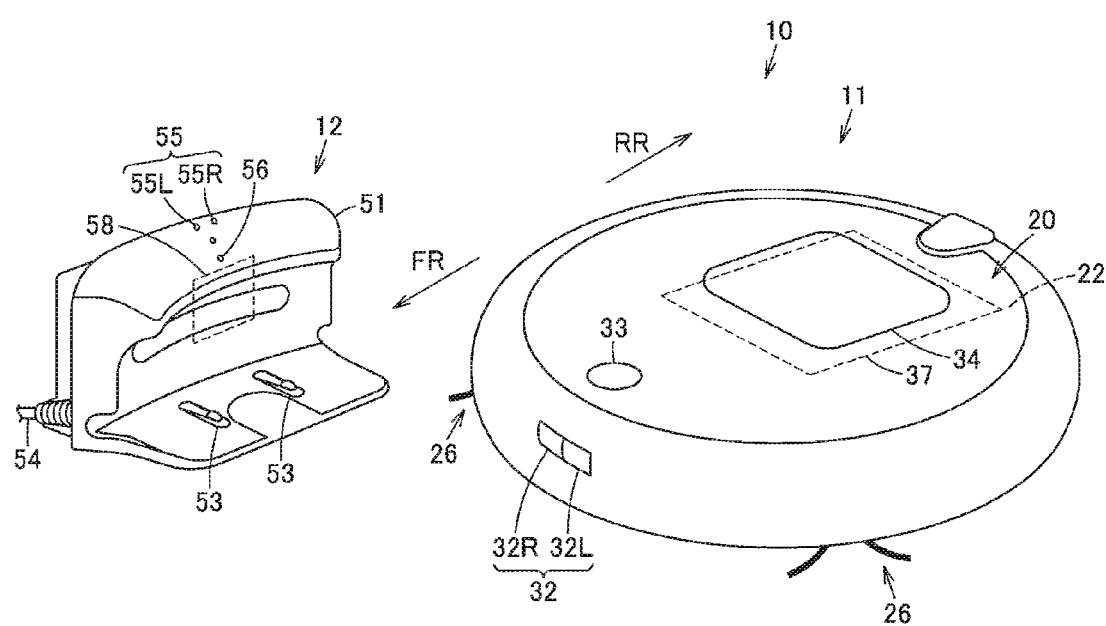
FIG. 1 is a perspective view showing an embodiment of a traveling device.
Figure 2A:
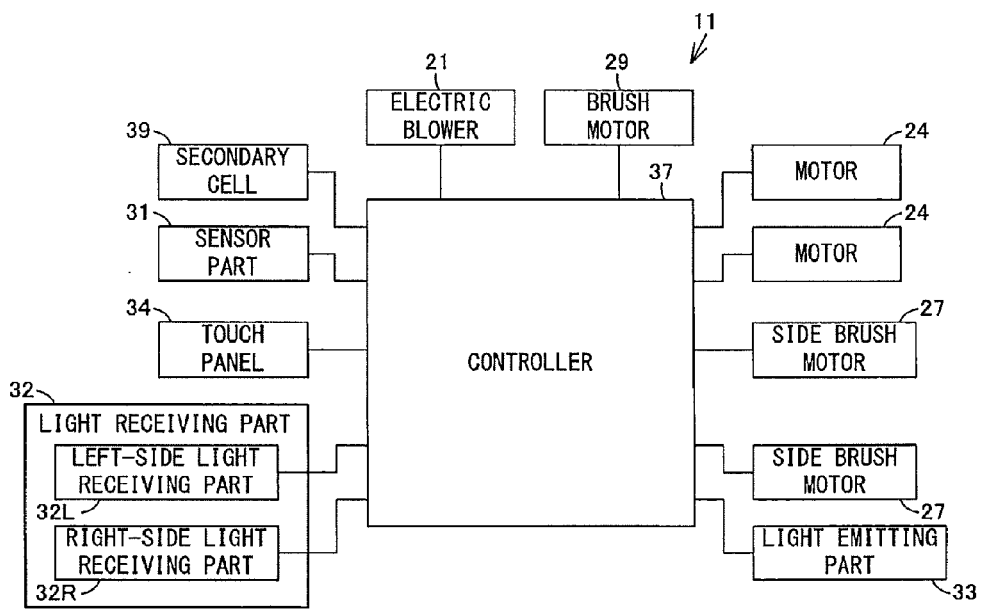
FIG. 2A is a block diagram showing the internal structure of an autonomous traveling unit of the traveling device and FIG. 2B is a block diagram showing the internal structure of a beacon unit of the traveling device.
Figure 2B:
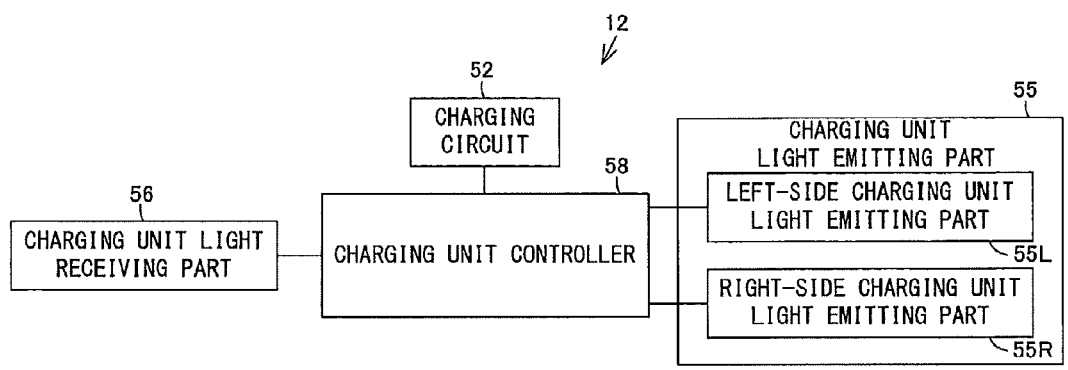
Figure 3:
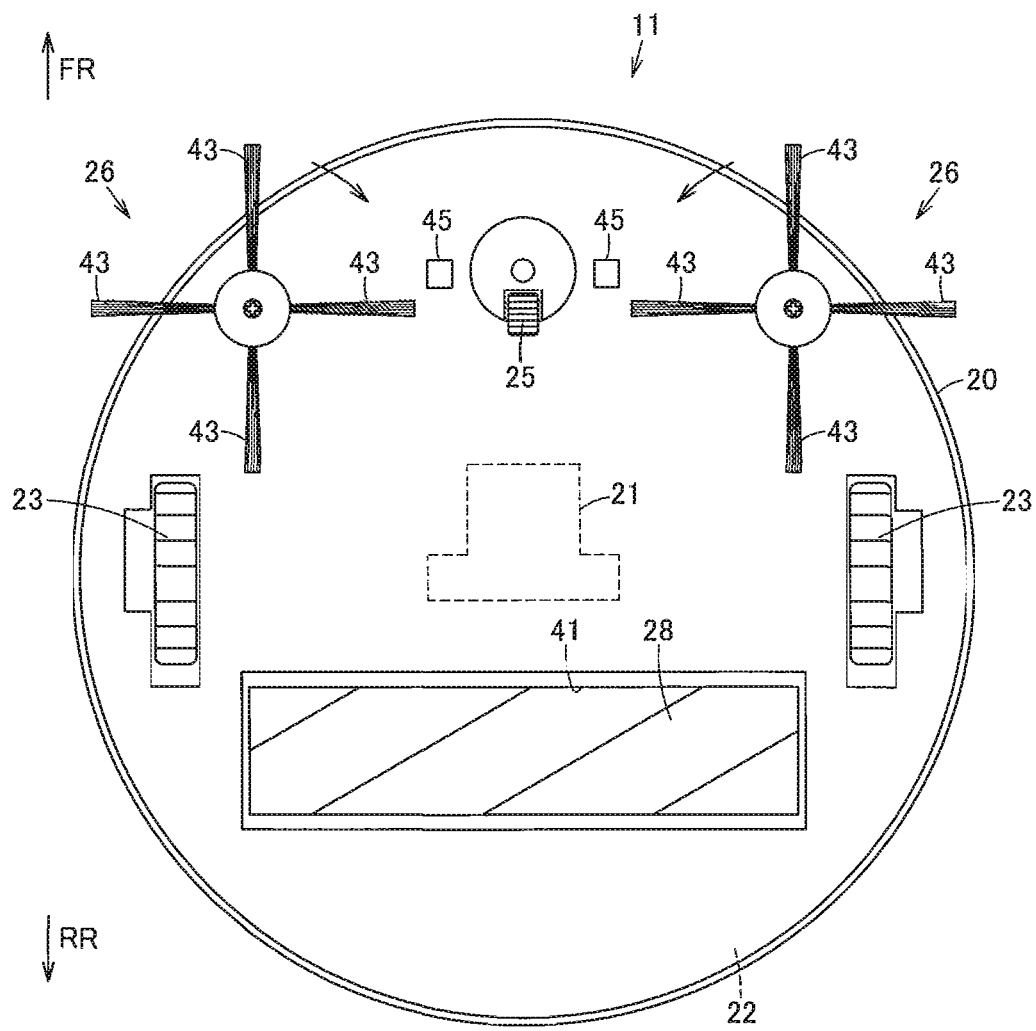
FIG. 3 is a plan view showing the autonomous traveling unit from below.

The structure of an embodiment is described below by referring to FIGS. 1 to 5.

By referring to FIGS. 1 to 5, 10 indicates a vacuum cleaner as a traveling device. The vacuum cleaner 10 includes a vacuum cleaner body 11 as an autonomous traveling unit and a charging unit (charging table) 12 functioning as a charging base for the vacuum cleaner body 11 and as a beacon unit to guide the vacuum cleaner body 11.

In this embodiment, the vacuum cleaner body 11 is what is called a self-propelled robot cleaner to clean a floor surface as a surface to be cleaned while traveling autonomously (in a self-propelled manner) on the floor surface. The vacuum cleaner body 11 includes: a hollow body case 20 as a traveling and cleaning part; an electric blower 21 as an operating part (cleaning part) housed in the body case 20; a dust collecting part 22 communicating with an intake side of the electric blower 21; drive wheels 23, 23 for example as multiple (a pair of) driving parts for traveling; motors 24, 24 that are driving elements (driving parts) functioning as operating parts to drive the corresponding drive wheels 23, 23; a turning wheel 25 for turning motion; side brushes 26, 26 that are auxiliary cleaning elements for example functioning as multiple (a pair of) turning clean-up parts (cleaning parts) arranged at a lower side of the body case 20 in a manner allowing turning motion of the side brushes 26, 26 along the floor surface; side brush motors 27, 27 that are turning driving elements (turning driving parts) functioning as operating parts (cleaning parts) to make the corresponding side brushes 26, 26 turn; a rotary brush 28 that is a cleaning element functioning as a rotary clean-up part (cleaning part) rotatably arranged at the lower side of the body case 20; and a brush motor 29 that is a rotation driving element (rotation driving part) functioning as an operating part (cleaning part) to rotate the rotary brush 28, for example. The vacuum cleaner body 11 further includes a sensor part 31 that is an operating part with various sensors functioning as an input/output and control part; a light receiving part 32 that is a traveling unit receiving element (traveling unit receiving part) functioning as a receiving element (receiving part); a light emitting part 33 that is a traveling unit transmitting element (traveling unit transmitting part) functioning as a transmitting element (transmitting part); a touch panel 34 having the function of an input operation element (input operation part) and that of a display element (display part); and a controller 37 formed of a circuit board and the like, for example. The vacuum cleaner body 11 includes a secondary cell 39 housed in the body case 20 to feed power to each of the aforementioned parts. In the below, a direction along a traveling direction of the vacuum cleaner body 11 (body case 20) is called a forward and rearward direction (including a direction of an arrow FR and an arrow RR shown for example in FIG. 1). A lateral direction (direction toward opposite sides) crossing (perpendicular) to the forward and rearward direction is called a width direction.

The body case 20 is formed into the shape of a flat circular column (disc) or the like using synthetic resin, for example. The body case 20 has an intake port 41 extending long in the width direction, specifically horizontally long opened in a position close to a rear side of a lower surface of the circular shape relative to a central area of the lower surface in the width direction.

The intake port 41 communicates with the intake side of the electric blower 21 through the dust collecting part 22. The rotary brush 28 is rotatably arranged in the intake port 41.

The electric blower 21 is to generate negative pressure by being driven to suck dust and dirt into the dust collecting part 22 through the intake port 41. As an example, the electric blower 21 is housed inside the body case 20 such that the intake side is pointed rearward and an axis direction extends in the forward and rearward direction (horizontal direction). The electric blower 21 becomes unnecessary if dust and dirt are to be swept up into the dust collecting part 22 for example with the rotary brush 28. Thus, the electric blower 21 is not an essential structure.

The dust collecting part 22 is to collect dust and dirt sucked in through the intake port 41 in response to drive of the electric blower 21.

Each drive wheel 23 is to make the vacuum cleaner body 11 (the body case 20) travel autonomously) on a floor surface in a direction of forward movement and that of rearward movement. Specifically, each drive wheel 23 is prepared for traveling. Each drive wheel 23 has a rotary axis not shown in the drawings extending in the lateral width direction. The drive wheels 23 are arranged symmetrically in the width direction.

Each motor 24 is arranged to be responsive to corresponding one of the drive wheels 23, for example. The motors 24 can drive the corresponding drive wheels 23 independently of each other.

The turning wheel 25 is arranged in a substantially central area of the width direction of the body case 20 and in a position on a front side. The turning wheel 25 is a driven wheel that can make turning motion along a floor surface.

Each side brush 26 has brush hairs 43 as multiple (such as three) clean-up bodies projecting radially to contact a floor surface. The side brushes 26, 26 are arranged in positions of the body case 20 ahead of the corresponding drive wheels 23, 23 and in lateral rear positions relative to the turning wheel 25.

Each side brush motor 27 can rotate a corresponding one of the side brushes 26 toward the center of the width direction of the body case 20. In other words, the side brush motors 27 can rotate the corresponding side brushes 26 such that the right-side brush 26 is rotated left and the left-side brush 26 is rotated right, specifically such that dust and dirt are collected toward the intake port 41 with each side brush 26.

The side brushes 26 and the side brush motors 27 are not essential structures if cleaning is done sufficiently with the electric blower 21 or the rotary brush 28.

The rotary brush 28 is formed into an elongated shape and has opposite end portions supported at opposite side portions of the intake port 41 in the width direction in a manner allowing rotation of the rotary brush 28. The rotary brush 28 projects downwardly of the lower surface of the body case 20 through the intake port 41. The rotary brush 28 is configured so as to sweep away dust and dirt with a lower side contacting a floor surface while the vacuum cleaner body 11 is placed on the floor surface.

The brush motor 29 is housed inside the body case 20. The brush motor 29 is connected to the rotary brush 28 through a gear mechanism as a mechanism part not shown in the drawings.

The rotary brush 28 and the brush motor 29 are not always required to be prepared as long as cleaning is done sufficiently with the electric blower 21 or the side brushes 26, 26.

The sensor part 31 for example functions as: a rotation number sensor such as an optical encoder to measure the number of rotations of the motor 24; an obstacle detecting element (obstacle sensor (distance measuring sensor)) such as an infrared sensor to detect an obstacle such as a wall or furniture; a step height detecting element (step height sensor) such as an infrared sensor to detect a step height from a floor surface and the like; and an anticollision detecting element (anticollision sensor) such as an infrared sensor for preventing collision for example with the charging unit 12. The sensor part 31 is arranged on each of an upper side, an outer circumferential side (front side and rear side), and a lower side of the body case 20, for example.

The light receiving part 32 is to estimate the position of the charging unit 12 by detecting an infrared ray and the like emitted from the charging unit 12. As an example, the light receiving part 32 includes a left-side light receiving part 32L and a right-side light receiving part 32R provided in positions separated to the right and to the left relative to a central area of the lateral direction on the front side of the outer circumferential side of the body case 20, for example. The light receiving parts 32L and 32R are arranged bilaterally symmetrically, for example.

The light emitting part 33 is to transmit (output) signal such as an infrared ray for example to the charging unit 12.

The light emitting part 33 is arranged on the upper front side of the body case 20, for example.

The touch panel 34 is to allow a user to enter various settings directly and is prepared for display of information of various types relating to the vacuum cleaner body 11. The touch panel 34 is arranged on the upper side of the body case 20, for example.

The controller 37 includes: a CPU as a controller body; a ROM as a storage storing fixed data such as a program to be read by the CPU; a RAM as an area storage to dynamically form various memory areas such as a work area to become an area for data processing by a program; and a timer to count time for calendar information such as a current date and time, for example. The controller 37 is electrically connected for example to the electric blower 21, each motor 24, each side brush motor 27, the brush motor 29, the sensor part 31, the light receiving part 32, the light emitting part 33, and the touch panel 34. The controller 37 has a cleaning mode and a charging mode. In the cleaning mode, the controller 37 controls drive of the electric blower 21, each motor 24, each side brush motor 27, the brush motor 29 and the like based on a result of detection by the sensor part 31. In the charging mode, the controller 37 charges the secondary cell 39 through the charging unit 12.

The secondary cell 39 is to feed power for example to the electric blower 21, each motor 24, each side brush motor 27, the brush motor 29, the sensor part 31, the light receiving part 32, the light emitting part 33, and the controller 37. The secondary cell 39 is electrically connected to charging terminals 45 exposed at opposite sides of the turning wheel 25, specifically at the front side of the lower surface of the body case 20, for example.

The charging unit 12 for example includes: a charging unit case 51 as a beacon unit case; a charging circuit 52 housed in the charging unit case 51; charging terminals 53 electrically connected to the charging circuit 52; a power cord 54 to be connected to a commercial power source, a charging unit light emitting part 55 as a beacon unit-side transmitting element (beacon unit-side transmitting part) to output various signals indicating position information and the like about the charging unit 12 by means of an infrared ray, for example; a charging unit receiving part 56 as a beacon unit-side receiving element (beacon unit-side receiving part) to receive light from the light emitting part 33 of the vacuum cleaner body 11; and a charging unit controller 58 that is a beacon unit control element (beacon unit controller) functioning as a transmission control element (transmission controller) to control the operation of the charging unit light emitting part 55, that of the charging unit light receiving part 56, and the like.

The charging unit case 51 is arranged in a position such as one near a wall section for partitioning a room where the charging unit case 51 does not hinder cleaning.

As an example, the charging circuit 52 is a constant current circuit to charge the secondary cell 39 the vacuum cleaner body 11 with the charging terminals 45 connected to the charging terminals 53.

The charging terminals 53 are exposed at a lower side of the charging unit case 51. The charging terminals 53 are to be mechanically and electrically connected to the charging terminals 45 of the vacuum cleaner body 11 having moved (returned) to the charging unit 12.

The power cord 54 is electrically connected to the charging circuit 52, the charging unit light emitting part 55, the charging unit light receiving part 56, and the charging unit controller 58. The power cord 54 is to be connected to a socket provided for example on a wall to allow feed of power from a commercial power source.

The charging unit light emitting part 55 is to emit light such as an infrared ray to the vacuum cleaner body 11. The charging unit light emitting part 55 includes a left-side charging unit light emitting part 55L and a right-side charging unit light emitting part 55R that is one beacon unit transmitting element (beacon unit-side transmitting part) and a different beacon unit transmitting element (beacon unit transmitting part) separated from each other at a central area of a lateral side of the charging unit case 51, for example. Specifically, the light emitting parts 55L and 55R are arranged in different positions. The charging unit light emitting part 55 is configured so as to emit light in response to receipt of a demand signal S at the charging unit light receiving part 56 transmitted from the light emitting part 33 of the vacuum cleaner body 11.

The charging unit light receiving part 56 is to grasp the position of the vacuum cleaner body 11 and that of the charging unit 12 relative to each other by detecting an infrared ray and the like emitted from the light emitting part 33 of the vacuum cleaner body 11. The charging unit light receiving part 56 is arranged on the upper side charging unit case 51, for example.

As an example, the charging unit controller 58 is to generate an infrared signal to be emitted from the charging unit light emitting part 55 and to process an infrared signal from the light emitting part 33 of the vacuum cleaner body 11 received at the charging unit light receiving part 56. The charging unit controller 58 has a guide mode in which the vacuum cleaner body 11 is guided toward the charging unit 12, a charging mode in which the secondary cell 39 is charged through the charging circuit 52, and a standby mode adopted in a period waiting for operation. The charging unit controller 58 is configured so as to make the light emitting parts 55L and 55R transmit guide signals according to respective timings in the guide mode in response to receipt of the demand signal S at the charging unit light receiving part 56 transmitted from the light emitting part 33 of the vacuum cleaner body 11.

The operation of the aforementioned embodiment is described next.

Generally, the vacuum cleaner body 11 of an autonomous traveling type works in a manner roughly divided into cleaning work by the vacuum cleaner body 11 and charging work of charging the secondary cell 39 with the charging unit 12.

(Cleaning Work)

In the vacuum cleaner body 11, when predetermined cleaning start time has come, the controller 37 shifted from the standby mode to the cleaning mode drives the electric blower 21, the drive wheels 23, 23 (motors 24, 24), the side brushes 26, 26 (side brush motors 27, 27), the rotary brush (brush motor 29) and the like. This makes the vacuum cleaner body 11 depart from the charging unit 12, for example. Then, the vacuum cleaner body 11 starts cleaning while traveling autonomously on a floor surface with the drive wheels 23, 23. The cleaning may be started in an arbitrarily settable position such as a position where the vacuum cleaner body 11 starts traveling or a doorway to a room.

During traveling, the controller 37 determines a distance for example from a wall surrounding a cleaning area or an obstacle in the cleaning area through the sensor part 31 and detects a step height from the floor surface and the like, thereby monitoring the traveling status of the vacuum cleaner body 11 (body case 20). In response to the detection by the sensor part 31, the controller 37 drives the drive wheels 23, 23 (motors 24, 24), thereby making the vacuum cleaner body 11 travel on the floor surface while making the vacuum cleaner body 11 avoid an obstacle or a step height, for example.

The vacuum cleaner body 11 collects dust and dirt into the intake port 41 with the turning side brushes 26, 26 and sucks in dust and dirt on the floor surface together with air through the intake port 41 where negative pressure generated as a result of drive of the electric blower 21 acts through the dust collecting part 22. Further, dust and dirt on the floor surface is swept up into the dust collecting part 22 with the rotary brush 28 being rotated.

The dust and dirt and the air sucked in through the intake port 41 together are collected separately at the dust collecting part 22. The air separated from the dust and dirt is sucked into the electric blower 21 to cool the electric blower 21. Then, the air is exhausted to the outside as exhaust air through an exhaust port in the body case 20 not shown in the drawings.

On condition that the cleaning of the cleaning area is finished or the level of the secondary cell 39 drops to a given level so that it is not sufficient for completing the cleaning (the voltage of the secondary cell 39 drops to a level near a discharge termination voltage) (if the vacuum cleaner body 11 is to return to the charging unit 12 (go home)), the controller 37 transmits the demand signal (request signal) S from the light emitting part 33 indicating request for completion of the cleaning mode and return to the charging unit 12 for shift to the charging mode. In the charging unit 12, in response to receipt of the demand signal S at the charging unit light receiving part 56, the charging unit controller 58 transmits a guide signal from the charging unit light emitting part 55 that is a return signal to guide the vacuum cleaner body 11 such that the vacuum cleaner body 11 returns to (moves to) the charging unit 12.

In the vacuum cleaner body 11, in response to receipt f the guide signal at the light receiving part 32, the controller 37 drives the drive wheels 23, 23 (motors 24, 24), so that the vacuum cleaner body 11 travels a given distance toward the charging unit 12. In this way, repeated transmission and receipt between the light receiving part 32 and the light emitting part 33 of the vacuum cleaner body 11 and the charging unit light emitting part 55 and the charging unit light receiving part 56 of the charging unit 12 makes the vacuum cleaner body 11 approach the charging unit 12 little by little. When the vacuum cleaner body 11 has moved (returned) to the charging unit 12, the charging terminals 45 are connected to the charging terminals 53 (mechanically and electrically). Further, each part is stopped to finish the cleaning work.

Figure 4A:
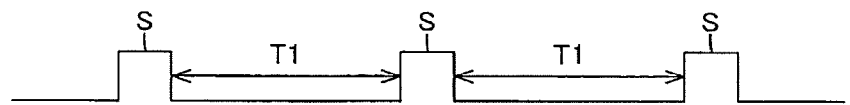
FIGS. 4A, 4B, 4C, 4D, 4E, 4F, and 4G are timing charts showing control of the embodiment of the traveling device.
Figure 4B:
Figure 4C:
Figure 4D:
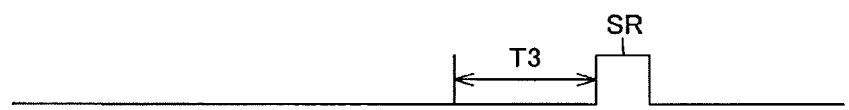
Figure 4E:
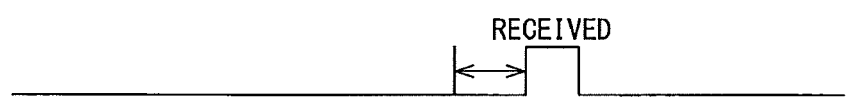
Figure 4F:
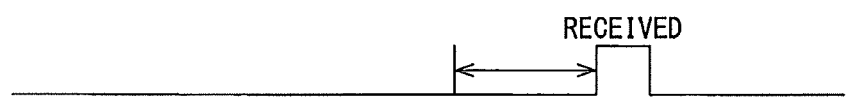
Figure 4G:
Figure 5:
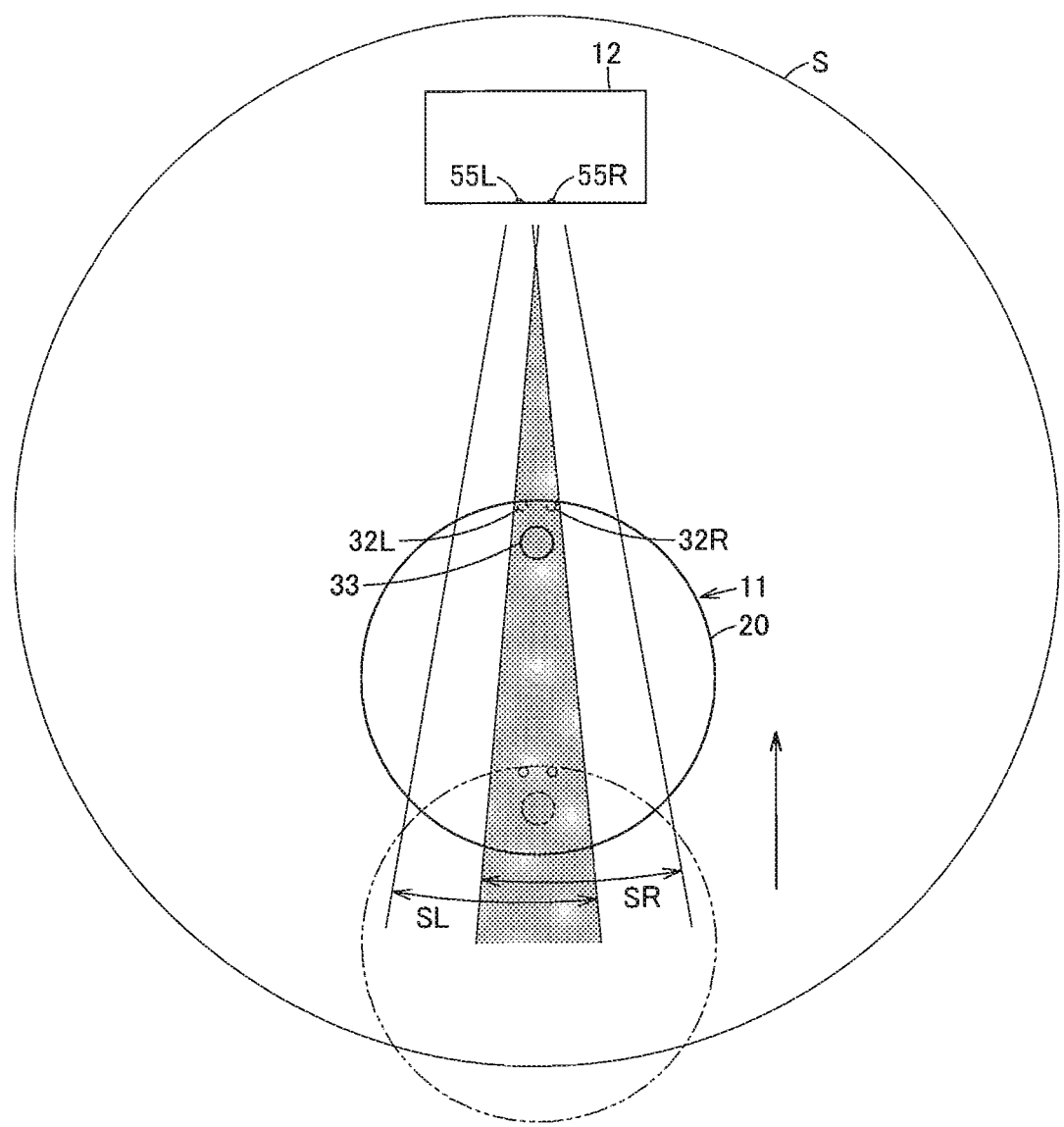
FIG. 5 is a plan view schematically showing principle of guide for the autonomous traveling unit by the beacon unit.

Control of the aforementioned return of the vacuum cleaner body 11 to the charging unit 12 is described in detail by referring to the timing charts of FIGS. 4A, 4B, 4C, 4D, 4E, 4F, and 4G. The controller 37 of the vacuum cleaner body 11 transmits the demand signal S from the light emitting part 33 at intervals of a fixed period of time T1 (FIG. 4A). It is preferable that the demand signal S be output with wide directivity so as to allow the charging unit 12 to receive this demand signal S irrespective of the position of the vacuum cleaner body 11 inside a room (FIG. 5). In the charging unit 12, if receipt of the demand signal S at the charging unit light receiving part 56 is determined (FIG. 4B), the charging unit controller 58 first outputs a guide signal SL as one guide signal from the left-side charging unit light emitting part 55L (FIG. 4C). Next, the charging unit controller 58 outputs a guide signal SR as a different guide signal from the right-side charging unit light emitting part 55R (FIG. 4D). These signals may be transmitted in reverse order. The guide signals SL and SR are the same (signals of the same code (symbol)). In this embodiment, the guide signals SL and SR are transmitted from the light emitting parts 55L and 55R after elapse of a given period of time T2 and elapse of a given period of time T3 respectively from the timing of receipt of the demand signal S. In other words, the charging unit 12 transmits the guide signals SL and SR from the light emitting parts 55L and 55R respectively according to respective timings (in a time-sharing manner). The given period of time T2 does not exceed a half of the given period of time T1 and may be 100 msec, for example. The given period of time T3 is twice the given period of time T2 (T2×2), for example. More specifically, the guide signal SL is output from the left-side charging unit light emitting part 55L with relatively narrow directivity in a radial pattern (long oval form) within a region on a left side when facing the front of the charging unit 12. The guide signal SR is output from the right-side charging unit light emitting part 55R with relatively narrow directivity in a radial pattern (long oval form) within a region on a right side when facing the front of the charging unit 12 (FIG. 5).

In the vacuum cleaner body 11, drive of the drive wheels 23, 23 is controlled depending on respective receiving statuses of the two guide signals SL and SR transmitted according to respective timings and the vacuum cleaner body 11 travels toward the charging unit 12. As an example, if it is determined that only the guide signal SL is received first at the left-side light receiving part 32L of the light receiving part 32 (FIG. 4E), drive of the drive wheels 23, 23 (motors 24, 24) is controlled so as to make the vacuum cleaner body 11 travel to the right relatively (the number of rotations of the left-side drive wheel 23 (motor 24) is made larger than that of the right-side drive wheel 23 (motor 24) relatively). If it is determined that only the guide signal SR is received first at the right-side light receiving part 32R of the light receiving part 32 (FIG. 4F), drive of the drive wheels 23, 23 (motors 24, 24) is controlled so as to make the vacuum cleaner body 11 travel to the left relatively (the number of rotations of the right-side drive wheel 23 (motor 24) is made larger than that of the left-side drive wheel 23 (motor 24) relatively). Drive of the drive wheels 23, 23 (motors 24, 24) is controlled in this way. Further, by controlling drive of the chive wheels 23, 23 (motors 24, 24) so as to make the vacuum cleaner body 11 travel to a position where it is determined that the guide signal SL is received at the left-side light receiving part 32L while the guide signals SL and SR are received at the right-side light receiving part 32R (FIG. 4G), the vacuum cleaner body 11 can travel toward the charging unit 12 linearly along a region (of a width from about 10 to about 20 cm, for example) where the guide signals SL and SR overlap each other.

The guide signals SL and SR are the same. However, based on given timing such as timing of transmission of the demand signal S from the light emitting part (timing of completion of transmission of the demand signal S), for example, the vacuum cleaner body 11 can determine whether a signal received at the light receiving part 32 is the guide signal SL or SR according to a period of time elapsed from this timing until when the signal is received. Specifically, in this embodiment, the controller 37 can determine that a signal received after elapse of the given period of time T2 from timing of transmission of the demand signal S is the guide signal SL and a signal received after elapse of the given period of time T3 (T2×2) from the timing of transmission of the demand signal S is the guide signal SR.

When the vacuum cleaner body 11 is connected to the charging unit 12 (when the charging terminals 45 and the charging terminals 53 are connected to each other mechanically and electrically), the vacuum cleaner body 11 stops transmission of the demand signal S from the light emitting part 33. Then, the charging unit 12 stops transmission of a guide signal from the charging unit light emitting part 55.

(Charging Work)

When given timing, for example, corresponds to predetermined charging start time has come, after the vacuum cleaner body 11 is connected to the charging unit 12, or when a given period of time has elapsed after the vacuum cleaner body 11 is connected to the charging unit 12, for example, the controller 37 and the charging unit controller 58 both shift to the charging mode to drive the charging circuit 52, and thereby start charging the secondary cell 39. If the voltage of the secondary cell 39 is determined to be raised to a given available voltage, the controller 37 and the charging unit controller 58 stops the charge by the charging circuit 52 to finish charging work. Then, the controller 37 and the charging unit controller 58 both shift to the standby mode.

According to the aforementioned embodiment, in response to receipt of the demand signal S at the charging unit light receiving part 56 transmitted from the light emitting part 33 of the vacuum cleaner body 11, the charging unit controller 58 transmits the guide signals SL and SR that are the same (signals of the same code) to guide the vacuum cleaner body 11 according to respective timings from the light emitting parts 55L and 55R respectively separated from each other. This allows the controller 37 of the vacuum cleaner body 11 to easily and reliably identify the guide signals SL and SR received at the light receiving part 32 based on a difference between the timings of receipt of these signals while these guide signals SL and SR are the same. As a result, the body case 20 (vacuum cleaner body 11) can travel toward the charging unit 12 depending on respective receiving statuses of the two guide signals SL and SR transmitted according to their respective timings. Thus, without the need for making the charging unit controller 58 of the charging unit 12 generate the guide signals SL and SR different from each other, for example, through complicated processing or by using a complicated structure, same guide signals can be separated between the guide signal SL to be transmitted from the left-side charging unit light emitting part 55L and the guide signal SR to be transmitted from the right-side charging unit light emitting part 55R, only by delaying the same guide signals, for example, by using a delay circuit. This achieves a simple structure.

As a result, the structure of the vacuum cleaner body 11 and that of the charging unit 12 (structure of vacuum cleaner 10) can be achieved at low cost.

In the charging unit 12, the guide signals SL and SR are transmitted from the light emitting parts 55L and 55R respectively only if the demand signal S transmitted from the light emitting part 33 of the vacuum cleaner body 11 is received at the charging unit light receiving part 56. This can suppress power consumption compared to constant transmission of guide signals and makes interference with a different unit that communicates, for example, by means of an infrared ray, unlikely.

The controller 37 makes the body case 20 travel according to the guide signals SL and SR received at the light receiving part 32. This can guide the vacuum cleaner body 11 to an intended position easily and reliably.

In the aforementioned embodiment, the vacuum cleaner body 11 has the function of an autonomous traveling unit.

Alternatively, the autonomous traveling unit is not always intended for cleaning but it may also be intended for image capturing with an image capturing element such as a camera.

The charging unit 12 has the function of a beacon unit to guide the vacuum cleaner body 11 (autonomous traveling unit) to a given position. Alternatively, a beacon unit may be provided independently of the charging unit 12.

While the light receiving part 32 is formed of the left-side and right-side light receiving parts 32L and 32R, it may alternatively be formed of a single light receiving part 32. Even in this case, exerting the control of the aforementioned embodiment can still achieve the same function and effect. Further, this can achieve a simpler structure.

In the vacuum cleaner body 11, a demand signal to be transmitted from the light emitting part 33 may be changed in response to intended operation (mode) and signals may be transmitted in a time-sharing manner as in the aforementioned embodiment from a beacon unit having received the demand signal. In this case, based on timing of transmission of the demand signal, the signals received at the light receiving part 32 can be discriminated without causing interference with a different signal according to their time differences from the timing of transmission. Further, various controls become feasible in response to these signals. As an example, travel of the vacuum cleaner body 11 can be controlled not only to make the vacuum cleaner body 11 approach a beacon unit as in the aforementioned embodiment, but also to guide the vacuum cleaner body 11 to a given position, to avoid collision with the beacon unit that may be caused by approach to the beacon unit within a given distance, for example, in the cleaning mode, or to avoid the vacuum cleaner body 11 from exceeding a virtual wall (virtual guard). Additionally, any other control, such as that of image capturing with an image capturing element (camera) apart from the traveling control becomes feasible, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A traveling device comprising an autonomous traveling unit capable of traveling autonomously and a beacon unit to guide the autonomous traveling unit,
the beacon unit comprising:
a case;
a beacon unit-side receiving part capable of receiving a demand signal from the autonomous traveling unit;
one beacon unit-side transmitting part and a different beacon unit-side transmitting part arranged in positions separated from each other in the case, the beacon unit-side transmitting parts transmitting respective guide signals to guide the autonomous traveling unit; and
a transmission controller to make the one beacon unit-side transmitting part and the different beacon unit-side transmitting part transmit the respective guide signals that are same guide signals and transmitted according to respective timings based on a timing when the beacon unit-side receiving part receives the demand signal, the autonomous traveling unit comprising:
- a body case;
- a drive wheel to allow travel of the body case;
- a controller to make the body case travel autonomously by controlling drive of the drive wheel;
- a transmitting part to transmit the demand signal; and
- a receiving part capable of receiving the respective guide signals transmitted from the one beacon unit-side transmitting part and the different beacon unit-side transmitting part, wherein, based on timing of transmission of the demand signal from the transmitting part, the controller distinguishes the two guide signals transmitted from the one beacon unit-side transmitting part and the different beacon unit-side transmitting part according to their time differences from the timing, and makes the body case travel toward the beacon unit depending on respective receiving statuses at the receiving part of the distinguished guide signals.

2. The traveling device in accordance with claim 1, wherein the one beacon unit-side transmitting part and the different beacon unit-side transmitting part are arranged in positions where the guide signals transmitted therefrom overlap each other at least at one part, the controller controls drive of the drive wheel so that the body case travels toward a direction where the guide signal transmitted from the different beacon unit-side transmitting part can be received by the receiving part in case only the guide signal transmitted from the one beacon unit-side transmitting part is received by the receiving part;

the controller controls drive of the drive wheel so that the body case travels toward a direction where the guide signal transmitted from the one beacon unit-side transmitting part can be received by the receiving part in case only the guide signal transmitted from the different beacon unit-side transmitting part is received by the receiving part, and the controller controls drive of the drive wheel so that the body case travels along a region where the guide signals overlap each other, in case the guide signals transmitted from the one beacon unit-side transmitting part and the different beacon unit-side transmitting part is received by the receiving part respectively.

* * * * *